US012614897B2

(12) United States Patent
Bröker et al.

(10) Patent No.: US 12,614,897 B2
(45) Date of Patent: Apr. 28, 2026

(54) STRIPPING UNIT OF A PRESSING TOOL, PRESSING TOOL AND METHOD FOR MOUNTING AN ADJUSTMENT UNIT

(71) Applicant: Weidmüller Interface GmbH & Co. KG, Detmold (DE)

(72) Inventors: Thilo Bröker, Detmold (DE); Detlev Hetland, Detmold (DE); Günther Hanning, Detmold (DE); Christian Heggemann, Detmold (DE); Siegfried Storm, Schlangen (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 362 days.

(21) Appl. No.: 18/257,529

(22) PCT Filed: Dec. 14, 2021

(86) PCT No.: PCT/EP2021/085759
§ 371 (c)(1),
(2) Date: Jun. 14, 2023

(87) PCT Pub. No.: WO2022/129092
PCT Pub. Date: Jun. 23, 2022

(65) Prior Publication Data
US 2024/0039255 A1      Feb. 1, 2024

(30) Foreign Application Priority Data
Dec. 17, 2020    (DE) ..................... 10 2020 133 953.4

(51) Int. Cl.
*H02G 1/12*                (2006.01)

(52) U.S. Cl.
CPC ................................. *H02G 1/1212* (2013.01)

(58) Field of Classification Search
CPC ...... H02G 1/12; H02G 1/1209; H02G 1/1212; H02G 1/1224; H02G 1/1236; H02G 1/1273; H01R 43/042; H01R 43/0421; B25B 5/02; B25B 5/04; B25B 5/06; B25B 5/10; B25B 5/16; B25B 7/02; B25B 7/04; B25B 7/12;
(Continued)

(56) References Cited

U.S. PATENT DOCUMENTS 2,752,676 A * 7/1956 Trickle, Jr. ........... H02G 1/1224
                                                            30/91.2
4,130,031 A * 12/1978 Wiener ................ H02G 1/1224
                                                            30/304
(Continued)

FOREIGN PATENT DOCUMENTS

DE          4008515 A1     1/1992
DE          9007593 U1     1/1993
(Continued)

*Primary Examiner* — Robert J Scruggs
(74) *Attorney, Agent, or Firm* — LAUBSCHER & FRETWELL, P.C.

(57) ABSTRACT

A stripping unit of a pressing tool for cutting into and stripping a conductor insulation of a conductor cable has a first clamping jaw with a first clamping lip and a cutting unit mounted in the clamping jaw. An adjustment unit for variably adjusting a cutting depth of the cutting unit is arranged in the clamping jaw. Also described are a pressing tool and a method for mounting an adjustment unit of a stripping unit.

9 Claims, 4 Drawing Sheets

(58) Field of Classification Search
   CPC .. B25B 7/18; B25B 7/22; B25B 13/48; B25B
   23/0007; B25F 1/00; B25F 1/003; B25F
   1/02
   See application file for complete search history.

(56) References Cited

U.S. PATENT DOCUMENTS

| | | | | | |
|---|---|---|---|---|---|
| 4,485,696 | A | * | 12/1984 | Bieganski | H02G 1/1212 |
| | | | | | 81/9.41 |
| 7,891,273 | B2 | * | 2/2011 | Hanning | H02G 1/1217 |
| | | | | | 81/9.41 |

FOREIGN PATENT DOCUMENTS

| | | | | | |
|---|---|---|---|---|---|
| DE | 102004003462 | B3 | 8/2005 | | |
| EP | 2056415 | B1 | 5/2009 | | |
| EP | 3054541 | A1 | 8/2016 | | |
| WO | WO-2013154515 | A2 | * | 10/2013 | E04F 21/185 |

* cited by examiner

STRIPPING UNIT OF A PRESSING TOOL, PRESSING TOOL AND METHOD FOR MOUNTING AN ADJUSTMENT UNIT

This application is a § 371 National stage entry of international patent application No. PCT/EP2021/085759 filed Dec. 14, 2021, which claims priority of patent application No. DE 10 2020 133 953.4 filed Dec. 17, 2020. The entire content of these applications is incorporated herein by reference.

BACKGROUND OF THE INVENTION

The present invention relates to a stripping unit of a pressing tool for cutting into and stripping a conductor insulation of a conductor cable, a pressing tool, and a method for mounting an adjustment unit of a stripping unit.

Generic stripping units are described in EP 2056415 B1, for example. In the stripping pliers, the stripping unit has a clamping jaw with a first clamping lip which can be pressed against a second clamping lip arranged on the stripping pliers, and has a first knife unit which is mounted in the clamping jaw and which can be pressed against a second knife unit behind the second clamping lip.

In order to be able to detach cable-insulating layers of different thickness or of different material design reliably from the conductor, there are several knife retainers which can be exchanged.

The construction shown and described there has its benefits.

The problem with this is the need to exchange knife retainers to detach the insulating layer from the conductor.

There is thus a need for a new stripping unit and a method for more simply mounting a stripping unit.

SUMMARY OF THE INVENTION

Accordingly, one object of the present disclosure is to provide a stripping unit of a pressing tool for cutting into and stripping a conductor insulation of a conductor cable.

Another object is to provide a method for mounting a stripping unit.

The stripping unit of a pressing tool for cutting into and stripping a conductor insulation of a conductor cable has a first clamping jaw with a first clamping lip which can be pressed against a second clamping lip arranged on the pressing tool, and has a first knife unit which is mounted in the clamping jaw.

An adjustment unit for variably adjusting a cutting depth of the knife unit is arranged in the clamping jaw, with an adjustment screw, a nut for fastening the adjustment screw in a receiving space of the clamping jaw and a plate for lifting or lowering the knife unit.

The adjustment screw is adjustable through an aperture in a floor of the receiving space.

The storage height of the knife unit in the clamping jaw is adjustable to different insulating material thicknesses of the conductor insulation of a conductor cable, without the need for different knife units with differently sized knifes.

According to an embodiment, the adjustment unit has a pressure plate which can be supported by the adjustment plate.

Such a pressure plate ensures that the knife unit rests uniformly.

Preferably, the plate is formed integrally with the adjustment screw.

As a result, the mounting effort of the stripping unit is reduced.

According to another embodiment, protrusions are molded on the side walls of the clamping jaw situated opposite one another on the receiving space. The nut is secured in a space between a floor of the receiving space and an underside of the protrusions which face the space against lateral displacement toward the side walls and against being lifted away from the floor.

This makes it possible to use an adjustment screw which is integrally formed with the plate and which can be introduced into the receiving spaces from the receiving space open upper side facing away from the floor.

According to one embodiment, an end piece of the adjustment screw extends from a plate side facing away from the floor into a bore in the pressure plate.

This enables easy access to the adjustment screw, for example with use of a screwdriver.

According to another embodiment, the receiving space of the clamping jaw has an inlet shaft through which the adjustment screw together with the nut can be introduced toward the floor in a lowerable manner.

According to yet another embodiment, the nut is a square nut, which enables rotational fixing of the nut in the receiving space of the clamping jaw.

The pressing tool according to the invention has two grips which are movable relative to one another, a housing shell and a stripping unit which is arranged on the housing shell and which has a clamping jaw pivotable relative to the housing shell.

The clamping jaw, together with a clamping lip on the front part of the housing shell, forms a tool mouth, in which two knife retainers, which are movable relative to one another, are each mounted with a stripping knife.

The stripping unit is distinguished by the design described above.

The method according to the invention includes the following method steps:

- screwing the adjustment screw onto the nut to such an extent that a first end of the adjustment screw does not protrude from the nut;
- inserting the adjustment screw with the nut into the receiving space of the clamping jaw;
- displacing the nut with the adjustment screw into a region between the protrusions and the floor until the first end of the adjustment screw is positioned on the aperture in the floor; and
- placing the pressure plate on the plate of the adjustment screw.

BRIEF DESCRIPTION OF THE DRAWINGS

The invention will be explained in greater detail below using embodiments with the aid of the accompanying figures in which.

DETAILED DESCRIPTION

In the following description of the figures, terms such as top, bottom, left, right, front, rear, etc. relate exclusively to the exemplary depiction and position, shown in the respective figures, of the stripping unit, pressing tool, clamping jaw, adjustment screw and the like. These terms should not be understood to be restrictive, i.e. these references may change through different working positions or the symmetrically identical design or the like.

Figures 1, 2:
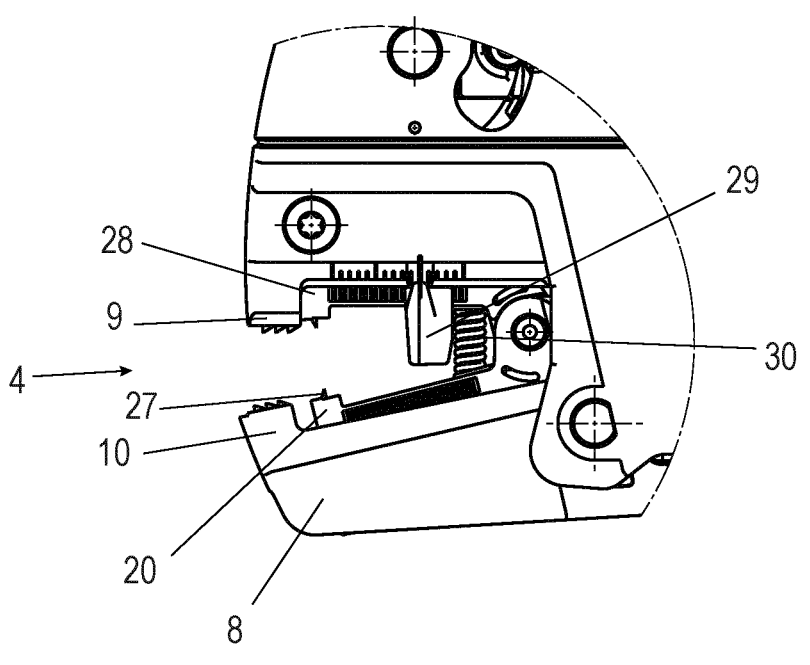
FIG. 1 is a side view of an embodiment of a pressing tool with a stripping unit according to the invention.
FIG. 2 is an enlarged view of a portion of the pressing tool in FIG. 1.

In FIG. 1, an embodiment of a pressing tool according to the invention is labelled with the reference number 1. The pressing tool 1 has two manual levers 2 and 3. One manual lever 2 is integrally molded on a housing shell 7, while the other manual lever 3 is pivotably mounted on the housing shell 7.

Instead of actuating the pressing tool 1 by the grips 2, 3, it is also conceivable to design the pressing tool 1 as an automatic or semi-automatic pressing tool with a motor drive.

The pressing tool 1 furthermore has a crimping unit 6 and a cutting unit 5 with which the conductor cable can be cut through.

Furthermore, the pressing tool 1 has a tool mouth, which is labelled here as the stripping unit 4, which a sheathing of a conductor cable segment can be removed from the conductor strand.

The stripping unit 4 has a first clamping jaw 8, at the front end of which a clamping lip 10 is arranged. The other part of the tool mouth is delimited by a second clamping lip 9 arranged on the housing shell 7 of the pressing tool 1.

A first knife unit 20, which is coupled to a second knife unit 28 via a spring element 30 and which is arranged behind the second clamping lip 9 in the mouth of the pliers, is mounted in the clamping jaw 8.

In the preferred embodiment shown here, as shown in FIG. 2, a conductor stop 29 is displaceably fixed on the upper knife unit 28 to set a length of the insulation material to be stripped.

As is depicted in FIGS. 3-9, an adjustment unit for variably adjusting a cutting depth of the knife unit 20 is arranged in the clamping jaw 8.

The adjustment unit has an adjustment screw 14, a nut 12 for fastening the adjustment screw 14 in a receiving space 21 of the clamping jaw 8 and a plate 11 for lifting or lowering the knife unit 20.

Figures 8, 9:
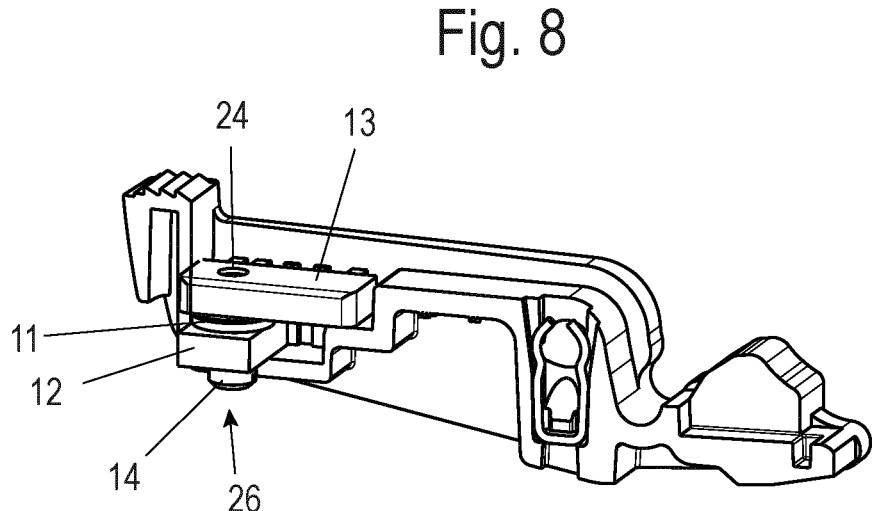

The adjustment screw 14 is adjustable through an aperture 19 in a floor of the receiving space 21, as is depicted in FIG. 9.

The design of the adjustment unit and the mounting thereof in the clamping jaw 8 will now be explained in greater detail using FIGS. 3-9.

Figure 3:
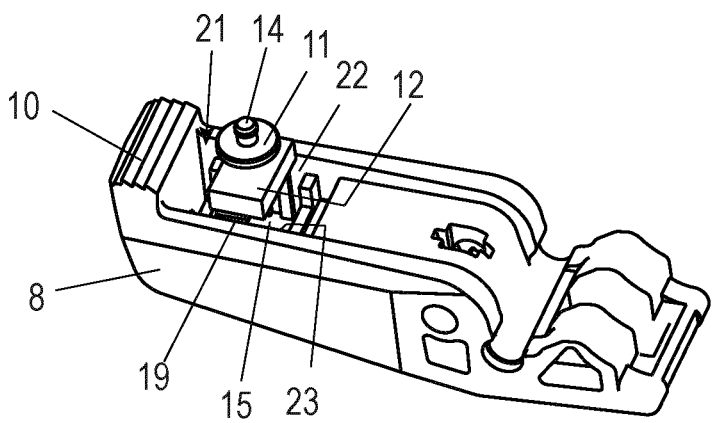
FIGS. 3-5 and 7 are perspective views of the clamping jaw of the stripping unit with an adjustment unit installed therein in different mounting steps.

As depicted in FIG. 3, the adjustment screw 14 is first screwed onto the nut 12 which is preferably formed as a multi-sided shape, in particular a square nut.

As shown in FIGS. 3-9, the face side of the adjustment screw 14 has a tool receptacle 26 at its end, for example an internally multi-sided aperture. A neck piece 32 provided with an external thread extends from this tool receptacle 26.

Above this neck piece 32, the diameter of the adjustment screw 14 is widened by a plate 11.

In addition to the integral form of the plate 11 with the adjustment screw 14, it is also conceivable to place or screw the plate 11 onto the screw.

Above the plate 11, there extends an additional neck piece of the adjustment screw 14, which is labelled end piece 25 and which serves to secure against displacing a pressure plate 13 on which the knife unit 20 rests when the stripping unit 4 is in the mounted state.

Figure 4:
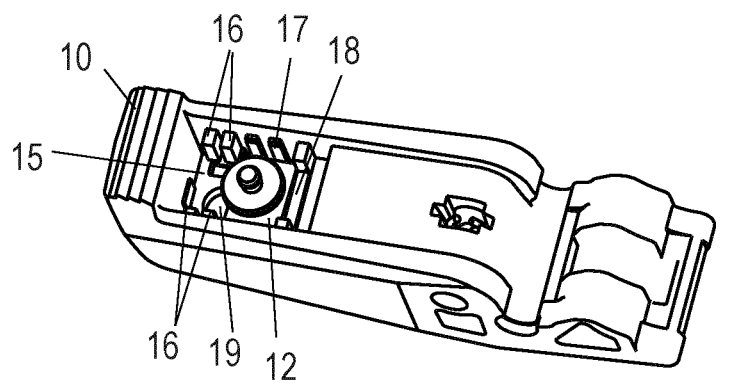

In the mounting steps shown in FIGS. 3 and 4, the adjustment screw 14 is screwed onto the nut 12 to such an extent that a first end (with the tool receptacle) of the adjustment screw 14 does not protrude from the nut 12.

In FIGS. 3 and 4, the adjustment screw 14 with the nut 12 is inserted from above into the receiving space 21 of the clamping jaw 8 The receiving space is open towards the tool mouth.

The nut 12 is pushed along an inlet shaft 17 provided in the receiving space 21 until it reaches the floor 15 of the receiving space 21.

Thereafter, the adjustment screw 14, together with the nut 12, is pushed along the floor 15 into a region between protrusions 16 and the floor 15 toward the first clamping lip 10.

In the embodiment shown here, the protrusions 16 are webs protruding from opposing side walls 22, 23 of the clamping jaw 8. Between a lower edge of these protrusions 16 and the floor 15, there is sufficient distance to accommodate the nut 12.

Figure 5:
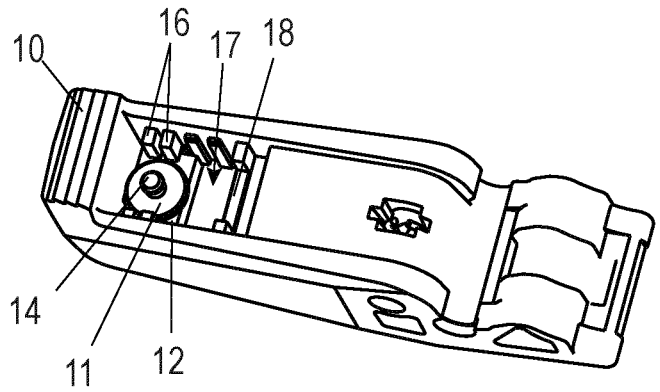
Figure 6:
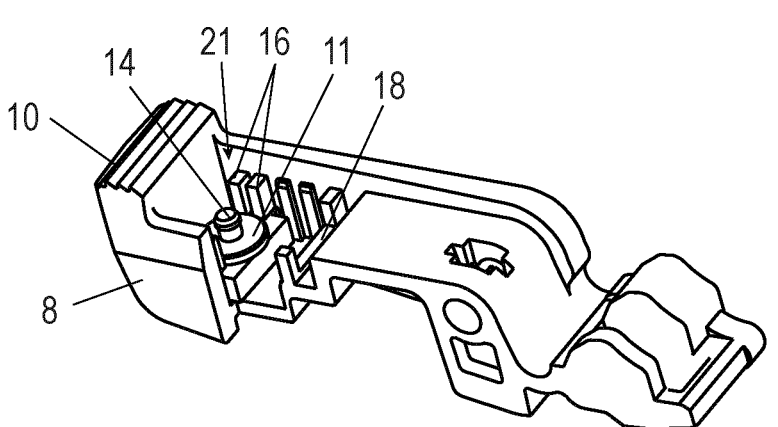
FIGS. 6, 8 and 9 are sectional views of the clamping jaw of FIGS. 3-5 and 7.

As shown in FIG. 5, the protrusions 16 prevent the nut 12 from being lifted away from the floor 15 in the position of the adjustment screws 14.

Furthermore, in this position, the first end of the adjustment screw 14 is positioned over an aperture 19 in the floor 15 of the receiving space 21, such that, by then turning the adjustment screw 14 into the aperture 19 in the floor 15, the nut 12 remains in its position, but the adjustment screw 14 vertically moves together with the plate 11. The adjustment screw is additionally secured against being pushed back into the inlet shaft 17 by positioning the end equipped with the tool receptacle 26 into the aperture 19 in the floor 15 of the receiving space 21.

The outline depiction of the clamping jaw 8 shown in FIG. 6 once again shows the locked position of the nut 12 between the floor 15 and the protrusions 16.

Figure 7:
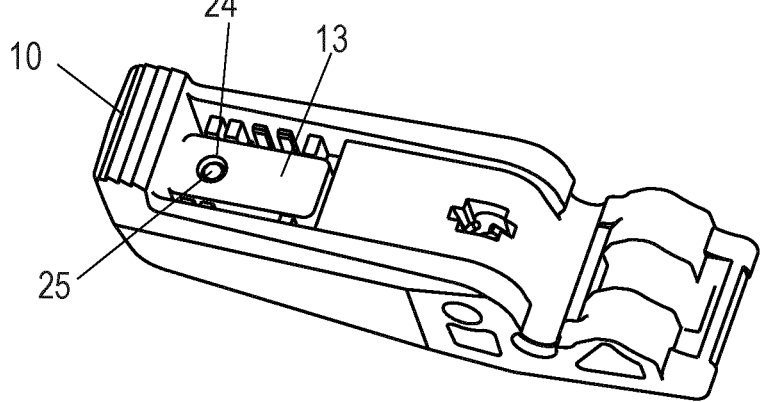

As is depicted in FIGS. 7, 8 and 9, the pressure plate 13 is then placed onto the plate 11 of the adjustment screw 14.

This pressure plate 13 includes a bore 24 into which the end piece 25 of the adjustment screw 14 extends and thus fixes the pressure plate 13 in the resting plane of the pressure plate 13 in a form-fitting manner.

An embodiment of the pressure plate 13 without such a bore 24 is also conceivable. In this case, the adjustment screw 14 ends on the upper side of the plate 11, such that an underside of the pressure plate 13 rests on the plate 11, as in the embodiment shown, and the pressure plate 13 in this case is secured inside the clamping jaw 8 against displacement away from the plate 11.

The knife unit 20 comes to rest on the pressure plate 13.

By adjusting the adjustment screw 14 it is thus made possible to lift or lower the pressure plate 13, which entails lifting or lowering the knife unit 20 to adjust the cutting depth of the knife 27 of the cutting unit 20 into the conductor insulation of the conductor cable.

The invention claimed is:

1. A stripping unit of a pressing tool for cutting into and stripping a conductor insulation of a conductor cable, including
    a first clamping jaw with a first clamping lip configured to
      be pressed against a second clamping lip arranged on
      the pressing tool; and
    a first knife unit mounted in the clamping jaw,
wherein
an adjustment unit for variably adjusting a cutting depth of the first knife unit is arranged in the clamping jaw including
an adjustment screw, a nut for fastening the adjustment screw in a receiving space of the clamping jaw, and an adjustment plate for lifting or lowering the cutting unit, and a pressure plate supportable by the adjustment plate, the adjustment screw being adjustable through an aperture in a floor of the receiving space.

2. The stripping unit according to claim 1, wherein the adjustment plate is integral with the adjustment screw.

3. The stripping unit according to claim 1, wherein protrusions are molded on side walls of the clamping jaw situated opposite one another on the receiving space, the nut being secured between a floor of the receiving space and an underside of the protrusions against lateral displacement toward the side walls and against being lifted away from the floor.

4. A method for mounting a stripping unit according to claim 3, including the steps of:

screwing the adjustment screw onto the nut to such an extent that a first end of the adjustment screw does not protrude from the nut;

inserting the adjustment screw with the nut into the receiving space of the clamping jaw;

displacing the nut with the adjustment screw into a region between the protrusions and the floor until the first end of the adjustment screw is positioned on the aperture in the floor; and placing the pressure plate on the plate of the adjustment screw.

5. The stripping unit according to claim 1, wherein an end piece of the adjustment screw extends from a plate side facing away from the floor into a bore in the pressure plate.

6. The stripping unit according to claim 1, wherein the receiving space of the clamping jaw has an inlet shaft configured to receive the adjustment screw with nut when arranged in the clamping jaw toward the floor.

7. The stripping unit according to claim 1, wherein the nut is a square nut.

8. A pressing tool, including a housing shell;

a stripping unit arranged on the housing shell and having a clamping jaw being pivotable relative to the housing shell;

wherein the clamping jaw and a clamping lip arranged on a front of the housing shell form a tool mouth, two knife retainers having a stripping knife and movable relative to one another being mounted therein, wherein the stripping unit is configured according to claim 1.

9. The pressing tool according to claim 8, and further including two handles being movable relative to one another for actuating the pressing tool.

\* \* \* \* \*